(12) United States Patent
Hakui et al.

(10) Patent No.: US 7,871,084 B2
(45) Date of Patent: Jan. 18, 2011

(54) TELESCOPIC ACTUATOR

(75) Inventors: Takehiko Hakui, Wako (JP); Kotaro Yamaguchi, Wako (JP); Masanori Watanabe, Wako (JP); Atsushi Yuta, Wako (JP); Hajime Kajiwara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 416 days.

(21) Appl. No.: 11/964,430

(22) Filed: Dec. 26, 2007

(65) Prior Publication Data

US 2008/0257081 A1 Oct. 23, 2008

(30) Foreign Application Priority Data

Dec. 27, 2006 (JP) .............................. 2006-352933

(51) Int. Cl.
*B60G 7/02* (2006.01)
*B60G 3/26* (2006.01)

(52) U.S. Cl. ............ 280/5.521; 280/5.522; 280/86.758; 280/86.75; 74/89.23; 310/80; 310/83

(58) Field of Classification Search ................ 280/5.52, 280/5.521, 86.75, 86.758, 86.751, 86.757, 280/5.522; 74/89.4, 89.41, 89.34, 89.23, 74/25; 188/129, 134; 310/75 R, 80, 83
See application file for complete search history.

(56) References Cited

U.S. PATENT DOCUMENTS

| 2,642,752 | A | * | 6/1953 | Geyer et al. ................. 74/89.41 |
| 4,747,319 | A | * | 5/1988 | Sakuta ....................... 74/89.37 |
| 4,973,070 | A | * | 11/1990 | Menichini et al. ........ 280/5.521 |
| 5,083,626 | A | | 1/1992 | Abe et al. |
| 5,099,161 | A | * | 3/1992 | Wolfbauer, III .............. 310/80 |
| 5,901,610 | A | * | 5/1999 | Schneider ................. 74/421 A |
| 6,315,086 | B1 | | 11/2001 | Schmitt et al. |
| 6,879,065 | B2 | * | 4/2005 | Corbett et al. ........... 310/12.01 |
| 7,621,539 | B2 | * | 11/2009 | Choi et al. ................. 280/5.52 |
| 2003/0233896 | A1 | * | 12/2003 | Nagai et al. ................ 74/89.23 |
| 2005/0115343 | A1 | | 6/2005 | Sakamaki |
| 2005/0155444 | A1 | | 7/2005 | Otaki et al. |
| 2006/0005645 | A1 | * | 1/2006 | Zhou ......................... 74/89.34 |
| 2006/0081076 | A1 | | 4/2006 | Otaki et al. |
| 2006/0081078 | A1 | * | 4/2006 | Nagai et al. ................ 74/89.23 |
| 2008/0079225 | A1 | * | 4/2008 | Choi et al. ................. 280/5.52 |

FOREIGN PATENT DOCUMENTS

DE 102 23 863 12/2003

(Continued)

*Primary Examiner*—Toan C To
*Assistant Examiner*—George D. Spisich
(74) *Attorney, Agent, or Firm*—Rankin, Hill & Clark LLP

(57) ABSTRACT

A telescopic actuator includes a motor, an input flange rotated by the motor, a male screw member coupled to the input flange, a female screw member threadedly engaged with the male screw member, an output rod coupled to the female screw member, the output rod being moved in an axial direction thereof to output a thrust force when the input flange is rotated, and a housing inside which the male screw member and the female screw member are accommodated. The input flange is supported by the housing such that a relative movement of the input flange with respect to the housing is allowed in a radial direction but restricted in the axial direction.

11 Claims, 9 Drawing Sheets

FOREIGN PATENT DOCUMENTS

| | | |
|---|---|---|
| DE | 10 2004 056 708 | 10/2005 |
| EP | 0 339 024 | 7/1991 |
| EP | 0 402 421 | 7/1993 |
| EP | 1 015 786 | 8/2003 |
| EP | 1 361 087 | 11/2003 |
| FR | 2 605 280 | 4/1988 |
| JP | 62-125952 | 6/1987 |
| JP | 2006-067649 | 3/2006 |
| WO | 2004/034550 | 4/2004 |

* cited by examiner

US 7,871,084 B2

TELESCOPIC ACTUATOR

CROSS-REFERENCE TO RELATED APPLICATION(S)

The present application claims priority from Japanese Patent Application No. 2006-352933 filed on Dec. 27, 2006, the entire content of which is incorporated herein by reference.

TECHNICAL FIELD

The present invention relates to a telescopic actuator having a screw feed mechanism configured such that a male screw member coupled to an input flange is threadedly engaged with a female screw member coupled to an output rod, in which the input flange is rotated by a motor to move the output rod in an axial direction for outputting a thrust force.

BACKGROUND ART

In a suspension apparatus of a vehicle, for example, an upper link and a lower link are controlled to protrude or to retract by an actuator, thereby restraining variations in camber angle and tread of a wheel caused by bumping and rebounding in order to enhance steering stability performance (see, e.g., JP 6-047388 B2). The actuator includes a motor and a feed screw mechanism in which a male screw member is relatively rotated with respect to a female screw member by the motor.

In this type of actuator having a feed screw mechanism, a male screw member is rotatably supported by a housing through a ball bearing, a female screw member is supported by the housing via a slide bearing so as to be slidable in an axial direction thereof, and the male screw member is threadedly engaged with the female screw member. However, according to this configuration, movements of the male and female screw members in a radial direction are regulated so that, when an excessive load is applied between the male and female screw members in the radial direction load, a smooth actuation of the feed screw mechanism is obstructed.

SUMMARY OF THE INVENTION

The present invention is made in view of foregoing circumstances, and provides a telescopic actuator having a feed screw mechanism in which a radial load is prevented from being excessively applied between a male screw member and a female screw member to enable a smooth actuation of the feed screw mechanism.

According to an aspect of the invention, a telescopic actuator includes a motor, an input flange rotated by the motor, a male screw member coupled to the input flange, a female screw member threadedly engaged with the male screw member, an output rod coupled to the female screw member, the output rod being moved in an axial direction thereof to output a thrust force when the input flange is rotated, and a housing inside which the male screw member and the female screw member are accommodated. The input flange is supported by the housing such that a relative movement of the input flange with respect to the housing is allowed in a radial direction but restricted in the axial direction.

Other aspects and advantages of the invention will be apparent from the following description, the drawings and the claims.

DETAILED DESCRIPTION

Hereinafter, embodiments of the invention will be explained with reference to the drawings. The following exemplary embodiments do not limit the scope of the invention.

Figure 1:
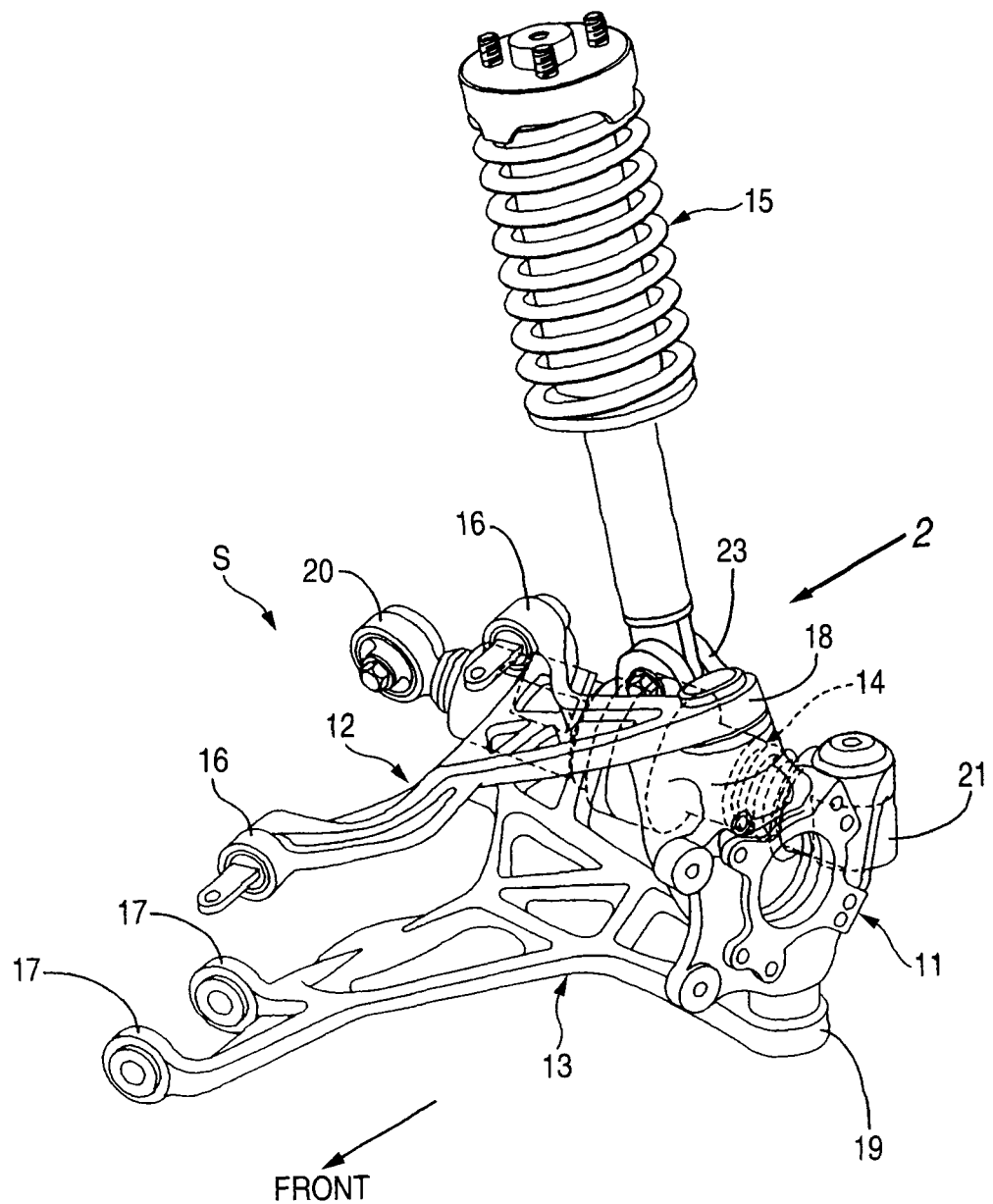
FIG. 1 is a perspective view of a suspension apparatus for a left rear wheel.
Figure 2:
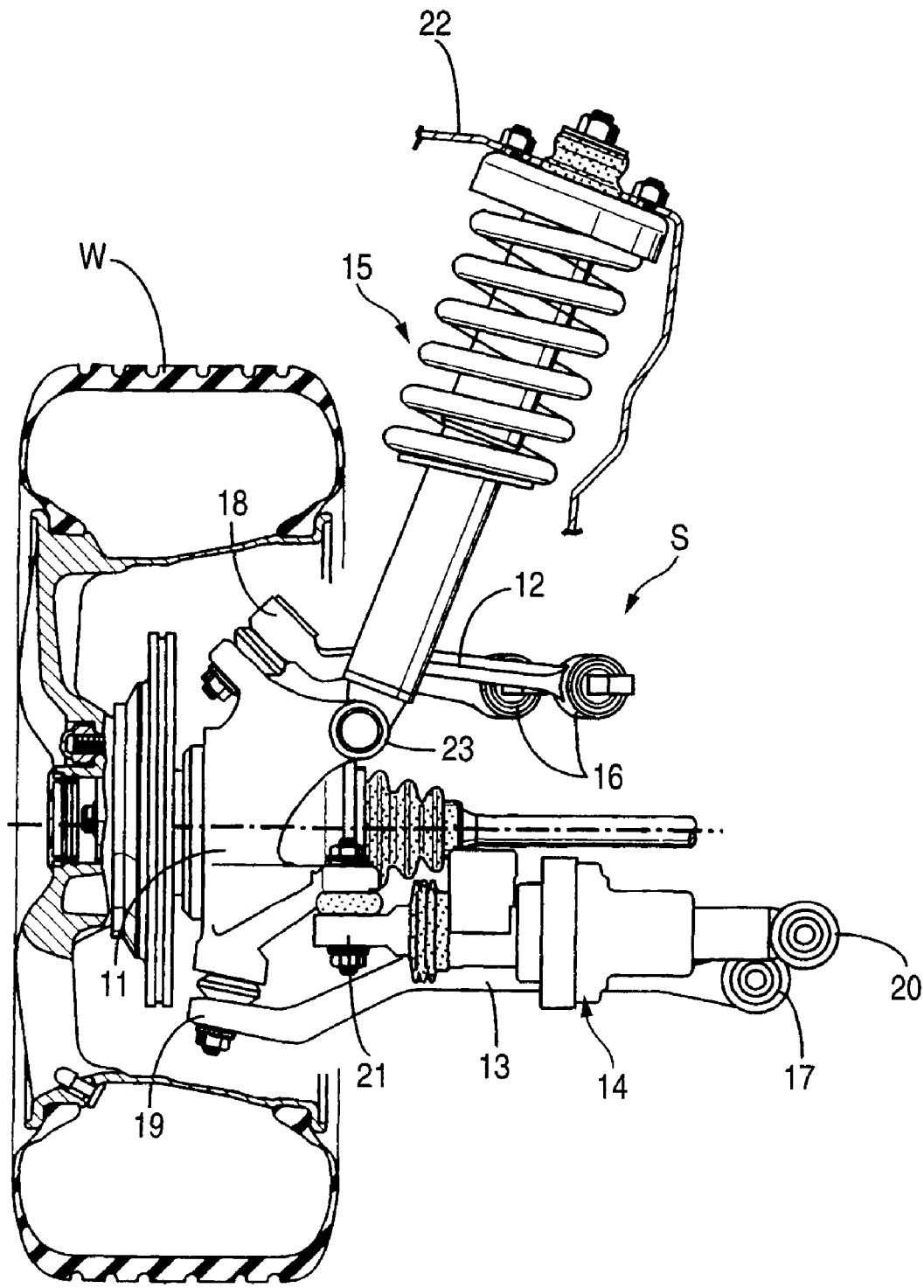
FIG. 2 is a view of the suspension apparatus when seen in a direction 2 shown in FIG. 1.

As shown in FIGS. 1 and 2, a double wishbone type rear suspension S for use in a four wheel steering system vehicle includes a knuckle 11 rotatably supporting a rear wheel W (a wheel), an upper arm 12 and a lower arm 13 respectively coupling the knuckle 11 to a vehicle body such that the knuckle 11 is movable in a vertical direction, a toe control actuator 14 (a telescopic actuator) coupling the knuckle 11 and the vehicle body to control a toe angle of the rear wheel W, a damper 15 with a suspension spring for damping the vertical movement of the rear wheel W.

Each of the upper arm 12 and the lower arms 13 has a base end coupled to the vehicle body via a rubber bush joint 16, 17 and a leading end coupled to an upper portion or a lower portion of the knuckle 11 via ball joints 18, 19. The toe control actuator 14 has a base end coupled to the vehicle body via a rubber bush joint 20 and a leading end coupled to a rear portion of the knuckle 11 via another rubber bush joint 21. The damper 15 has an upper end fixed to the vehicle body, e.g., to an upper wall 22 of a suspension tower, and a lower end coupled to the upper portion of the knuckle 11 via a rubber bush joint 23.

When the toe control actuator 14 is extended, the rear portion of the knuckle 11 is pushed outwardly in a vehicle width direction, whereby the toe angle of the rear wheel W is changed toward a toe-in direction. When the toe control actuator 14 is contracted, the rear portion of the knuckle 11 is pulled inwardly in the vehicle width direction, whereby the toe angle of the rear wheel W is changed toward a toe-out direction. Accordingly, besides a normal front wheel steering by operating a steering wheel, the toe angle of the rear wheel W is controlled in accordance with a vehicle speed and a steering angle of the steering wheel. Thus, straight running stability performance and turning performance of a vehicle can be enhanced.

Next, a structure of the toe control actuator 14 will be described below in detail with reference to FIGS. 3 to 7.

Figure 3:
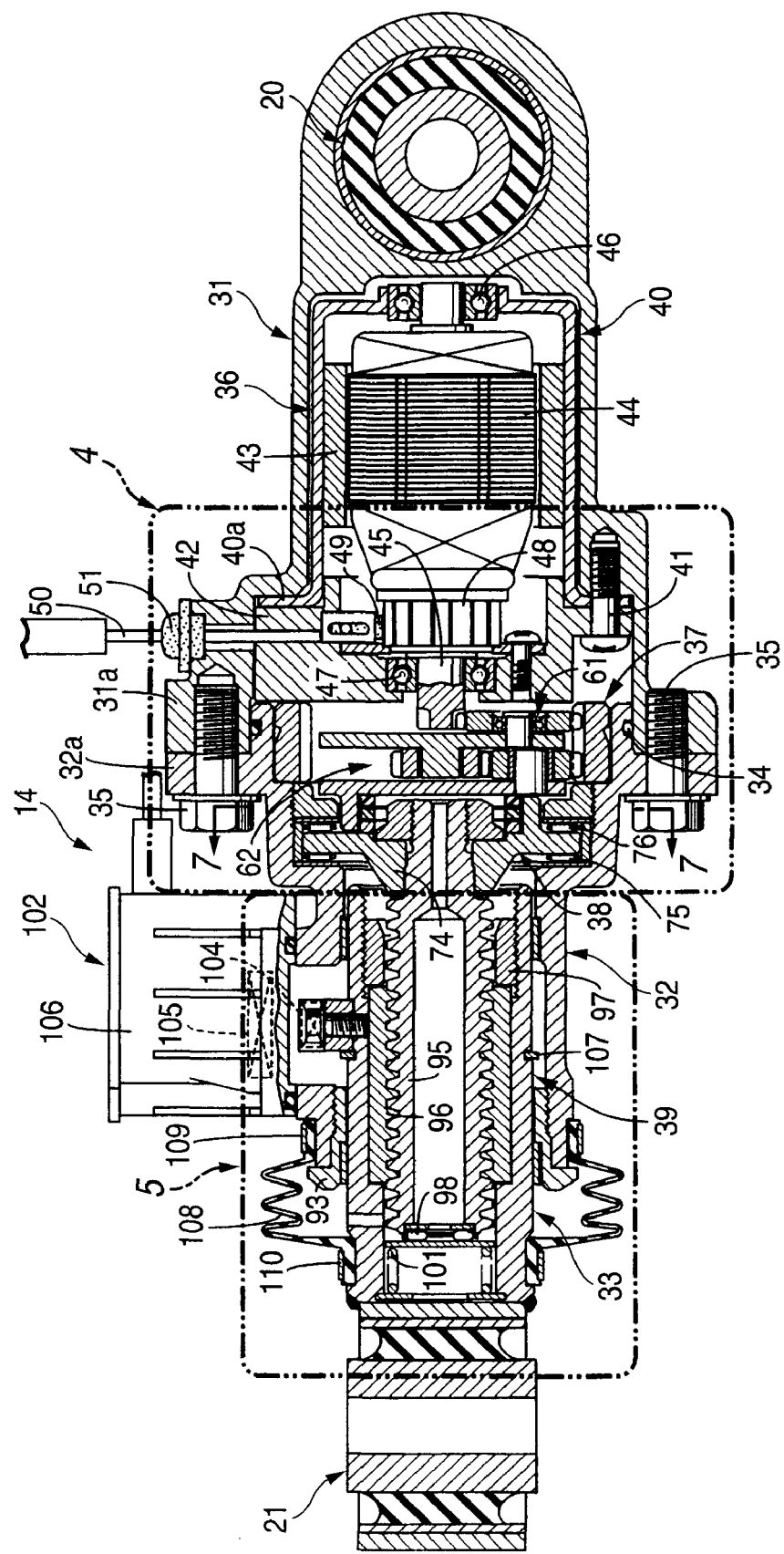
FIG. 3 is a longitudinal section view of a toe control actuator.
Figure 4:
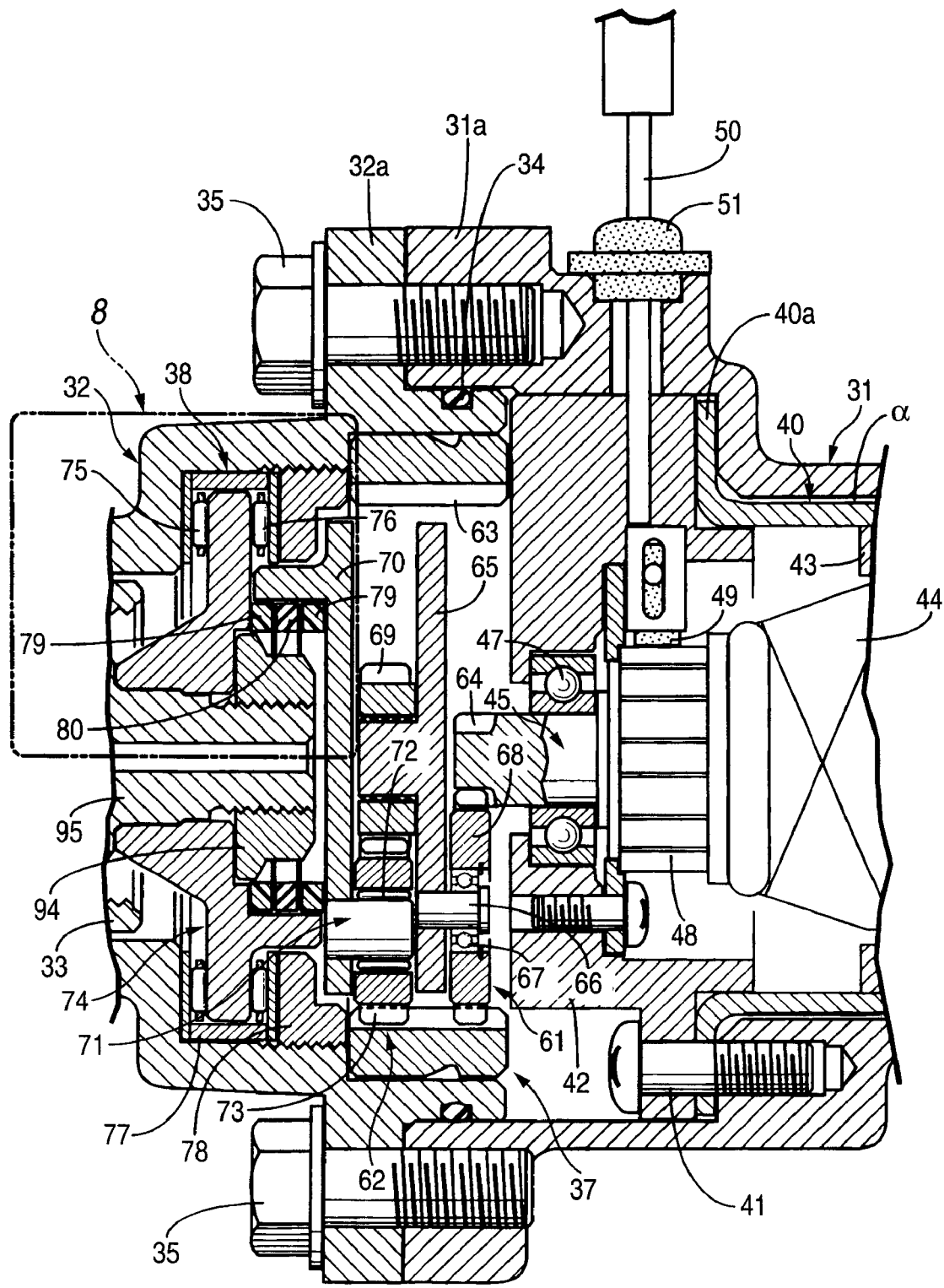
FIG. 4 is an enlarged view of the portion 4 shown in FIG. 3.

As shown in FIGS. 3 and 4, the toe control actuator 14 includes a first housing 31 to which the rubber bush joint 20 to be coupled to the vehicle body is integrally provided, and a second housing 32 (a housing) to which the rubber bush joint 21 to be coupled to the knuckle 11 is provided. The second housing 32 supports an output rod 33 such that the output rod 33 is protrudable and retractible with respect to the second housing 32. The mutually opposing portions of the first and second housings 31, 32 are socket fitted with each other with a seal member 34 interposed therebetween. The respective opposing portions have joining flanges 31a, 32a that are fastened together with bolts 35. A brush-equipped motor 36, which functions as a drive source, is accommodated inside the first housing 31. A planetary gear type reduction gear 37, an elastic coupling 38, and a feed screw mechanism 39 having a trapezoidal screw thread are accommodated inside the second housing 32.

The first housing 31 accommodating the motor 36 and the second housing 32 accommodating the reduction gear 37, the coupling 38 and the feed screw mechanism 39 are respectively assembled beforehand as sub assemblies, and the respective sub assemblies are then joined together as the toe control actuator 14. The first housing 31 and the second housing 32 are joined in a detachable manner. Therefore, the motor 36 may be replaced with a motor having a greater output or a smaller output, or operation characteristic of the reduction gear 37 and/or the feed screw mechanism 39 may be changed simply by replacing the sub assembly of the first housing 31 or the second housing 31 without changing the entire design of the toe control actuator 14. This can enhance versatility with respect to various models and designs, and thus can reduce cost.

A yoke 40 having a shape of a cup and a bearing holder 42 constitutes an outer shape of the motor 36. The yoke 40 has a flange 40a to which the bearing holder 42 is fastened with bolts 41. The bolts 41 are screwed into the first housing 31 on a surface facing the second housing 32, whereby the motor 36 is fixed to the first housing 31.

An annular stator 43 is supported on an inner peripheral surface of the yoke 40. A rotor 44 is disposed on an inner side the stator 43. A rotation shaft of the rotor has one end rotatably supported on a ball bearing 46 which is provided at a bottom portion of the cup-shaped yoke 40, and the other end rotatably supported on another ball bearing 47 provided on the bearing holder 42. A brush 49 is supported on an inner surface of the bearing holder 42. The brush slidingly contacts with a commutator 48 provided on an outer periphery of the rotation shaft 45. A conducting wire 50 extending from the brush 49 is drawn out through a grommet 51 provided on the first housing 31.

The yoke 40, which forms a part of the outer shape of the motor 36, is a rigid member for accommodating the stator 43 and rotor 44 therein. Because this yoke 40 is fixed to the first housing 31, a load input from the rear wheel W to the toe control actuator 14 is received by the first housing 31 so that the load is less likely to be applied to the motor 36. Thus, durability and reliability of the motor 36 can be enhanced. Further, a clearance a (a space) is provided between an outer peripheral surface of the yoke 40 of the motor 36 and an inner peripheral surface of the first housing 31. This clearance a restrains an actuation noise of the motor 36 from leaking out from the first housing 31. Moreover, the clearance a additionally helps to restrain an external force acting on the first housing 31 from being transmitted to the motor 36.

Further, the motor 36 and the first housing 31 are fixed together with the bolts 41 that are used to fasten the yoke 40 of the motor 36 and the bearing holder 42. Therefore, compared with a case in which the motor 36 is fixed to the first housing 31 with bolts other than the bolts 41, the number of bolts can be reduced. Also, a space required for arranging the extra bolts can be saved. Accordingly, it is possible to provide the toe control actuator 14 of a smaller size.

As shown in FIGS. 3 and 4, the reduction gear 37 includes a first planetary gear mechanism 61 and a second planetary gear mechanism 62 that are coupled in to have a two-stage structure, i.e., a tandem arrangement. The first planetary gear mechanism 61 includes a ring gear 63 fixedly fitted into an opening portion of the second housing 32, a first sun gear 64 formed directly on a leading end of the rotation shaft 45 of the motor 36, a first disk-shaped carrier 65, and four first pinions 68. Each of the first pinions 68 is rotatably supported on an associated one of first pinion pins 66 via respective ball bearings 67, and is engaged with both the ring gear 63 and the first sun gear 64. The first pinion pins 66 are press-fitted into the first carrier 65, and are supported by the first carrier 65 in a cantilevered manner. In the first planetary gear mechanism 61, a rotation of the first sun gear 64 (a first input member) is decelerated and transmitted to the first carrier 65 (a first output member).

The second planetary gear mechanism 62 includes the ring gear 63, which is shared with the first planetary gear mechanism 61, a second sun gear 69 fixed to the center of the first carrier 65, a disk-shaped second carrier 70, and four second pinions 73. Each of the second pinions 73 is rotatably supported on an associated one of second pinion pins 71 via respective slide bushes 72, and is engaged with both the ring gear 63 and the second sun gear 69. The second pinion pins 71 are press fitted into the second carrier 70, and are supported by the second carrier 70 in a cantilevered manner. In the second planetary gear mechanism 62, a rotation of the second sun gear 69 (a second input member) is decelerated and transmitted to the second carrier 70 (a second output member).

As described above, the first and second planetary gear mechanisms 61, 62 are coupled together in series. Therefore, a large deceleration ratio (a gear reduction ratio) can be obtained with a smaller size of the reduction gear 37. Also, the sun gear 64 of the first planetary gear mechanism 61 is not fixed to the rotation shaft 45 of the motor 36 but is formed directly on the rotation shaft 45. Thus, compared with a structure in which a first sun gear 64 is provided separately from the rotation shaft 45, the number of parts can be reduced. Further, a diameter of the first sun gear 64 can be minimized so that a large deceleration ratio can be set in the first planetary gear mechanism 61.

The second carrier 70, which is an output member of the reduction gear 37, is coupled to an input flange 74, which is an input member of the feed screw mechanism 39, via the coupling 38. The input flange 74 is formed substantially in a disk shape, and is rotatably supported by a pair of thrust bearings 75, 76 holding an outer peripheral portion of the input flange 74 therebetween. More specifically, a ring-shaped lock nut 78 is fastened into an inner peripheral surface of the second housing 32 such that a spacer collar 77 is sandwiched therebetween. Thus, a relative movement of the lock nut 78 with respect to the second housing 32 in the axial direction is restricted. The thrust bearing 75 is arranged so as to support a thrust load between the second housing 32 and input flange 74 while the other thrust bearing 76 is arranged so as to support a thrust load between the lock nut 78 and input flange 74.

Figure 6:
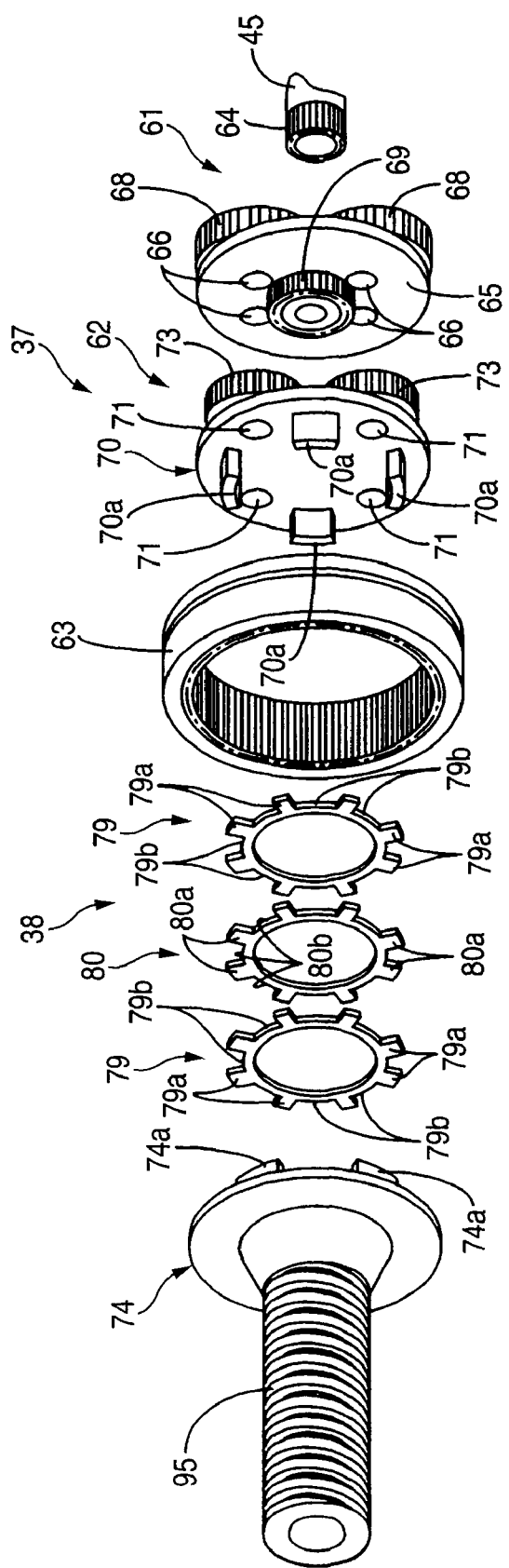
FIG. 6 is an exploded perspective view of a reduction gear and a coupling.
Figure 7:
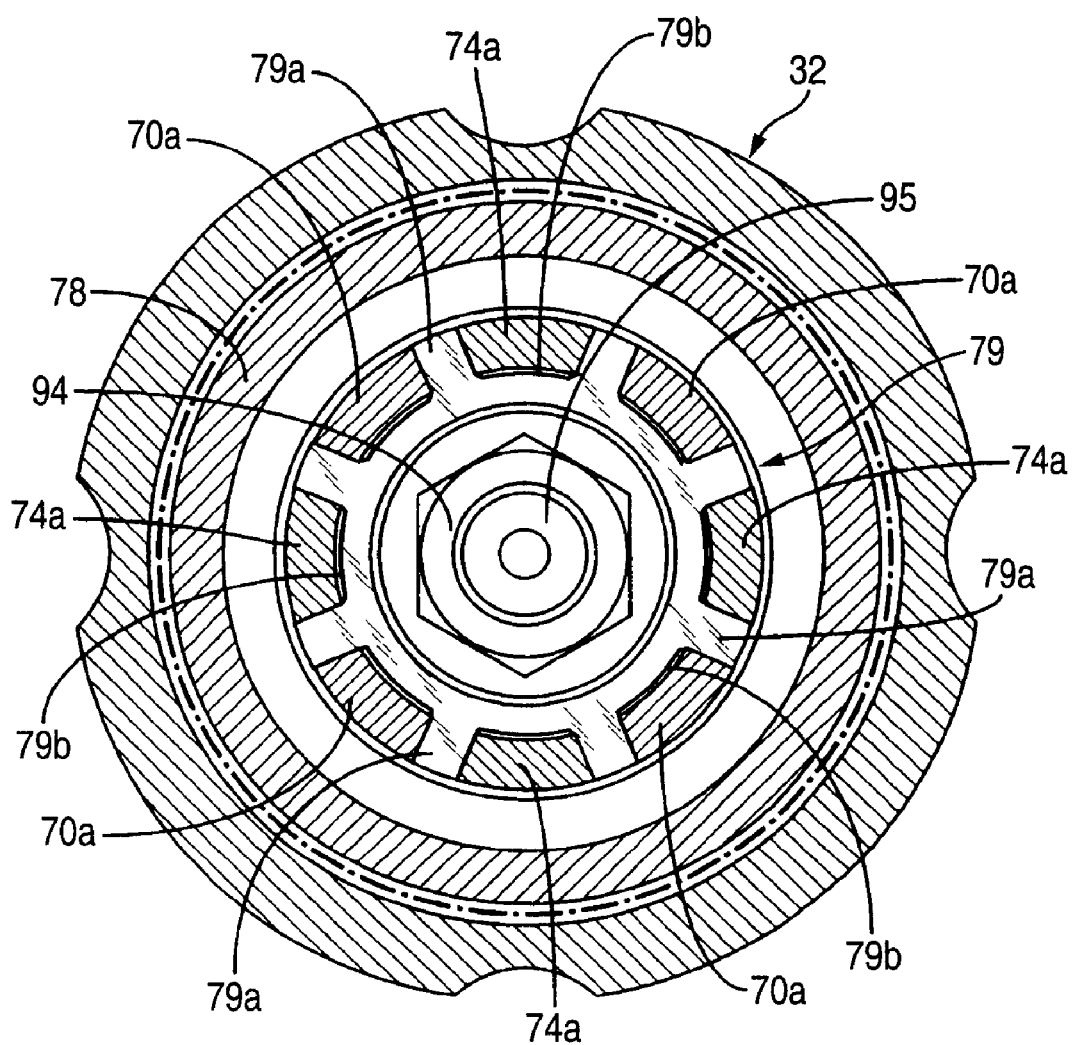
FIG. 7 is an enlarged section view taken along the line 7-7 shown in FIG. 3.

As shown in FIGS. 4, 6 and 7, the coupling 38 includes two outer elastic bushes 79 (an elastic bush portion) made of, e.g., polyacetal, and an inner elastic bush 80 (an elastic bush portion) made of, e.g., silicone rubber. Each of the outer elastic bushes 79 has eight projections 79a extending radially from an outer circumference thereof. The projections 79a are disposed at regular intervals along a circumferential direction of each of the outer elastic bushes 79 with eight grooves 79b being formed between each of the adjacent projections 79a. Likewise, the inner elastic bush 80 has eight projections 80a extending radially from an outer circumference thereof. The projections 80a are disposed at regular intervals along a circumferential direction of the inner elastic bush 80 with eight grooves 80b being formed between each of the adjacent projections 80a. The second carrier 70 has four pawls 70a formed on a surface facing the input flange 74. The pawls 70a are disposed at regular intervals, each extending in an axial direction. Likewise, the input flange 74 has four pawls 74a form on a surface facing the second carrier 70. The pawls 74a are disposed at regular intervals, each extending in the axial direction.

The inner elastic bush 80 is sandwiched between the outer elastic bushes 79 such that the projections 79a, 80a are in phase with each other, i.e., axially aligned. The pawls 70a of the second carrier 70 and the pawls 74a of the input flange 74 are alternately engaged with eight groove sections, each of the sections being formed by the grooves 79b, 80b that are axially aligned.

Accordingly, a torque of the second carrier 70 is transmitted from the pawls 70a of the second carrier 70 to the input flange 74 through the projections 79a, 80a of the outer and inner elastic bushes 79, 80 and the pawls 74a of the input flange 74. The outer elastic bushes 79 and the inner elastic bush 80 are both made of elastic material. Thus, the outer elastic bushes 79 and the inner elastic bush 80 absorb a slight axial difference between the second carrier 70 and the input flange 74, and also absorb a sudden change of the torque, thereby enabling a smooth power transmission.

Figure 5:
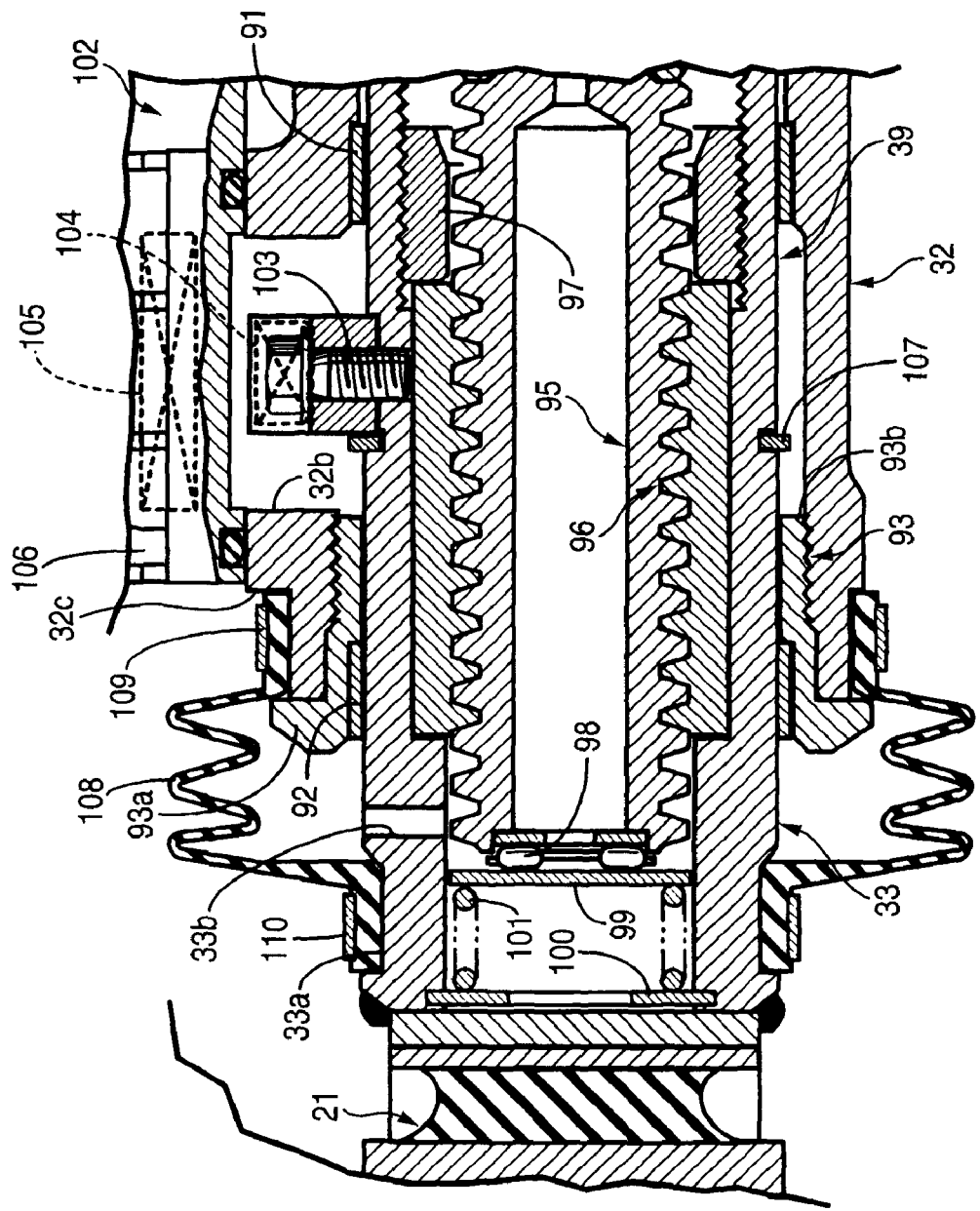
FIG. 5 is an enlarged view of the portion 5 shown in FIG. 3.

As shown in FIG. 5, a first slide bearing 91 is fixed to the inner peripheral surface of the second housing 32 at an intermediate portion of the second housing 32 in the axial direction. A second slide bearing 92 is fixed to an inner peripheral surface of an end member 93 screwed into an end portion of the second housing 32 in the axial direction. The output rod 33 is slidably supported by the first and second slide bearings 91, 92. The feed screw mechanism 39 converts the rotation of the input flange 74 to a thrust movement of the output rod 33. The feed screw mechanism 39 includes a male screw member 95 penetrating through the center of the input flange 74 and fastened with a nut 94 (see FIG. 4), and a female screw member 96 threadedly engaged with an outer peripheral surface of the male screw member 95. The female screw member 96 is fitted inside the inner peripheral surface of the hollow output rod 33, and is fixed thereto by a lock nut 97. The male screw member 95 is a hollow member formed with a hole penetrating in an axial direction, i.e., in a longitudinal direction thereof.

As described above, the output rod 33 is supported inside the second housing 32 a plurality of slide bearings 91, 92 (two in the embodiment). Therefore, a radial load applied to the output rod 33 can be reliably supported by the second housing 32, thereby preventing the radial load from being applied from the female screw member 96 to the male screw member 95.

A spring base 99 is supported via a thrust bearing 98 at a leading end of the male screw member 95. A coil spring 101 is compressed between the spring base 99 and another spring base 100 provided on a leading end of the output rod 33. The spring force of the coil spring 101 biases the female spring member 96 fixed to the output rod 33 and the male screw member 95 in threaded engagement with the female screw member 96 in opposite directions respectively, thereby eliminating play between threads of the male and female screw members 95, 96.

According to the above configuration, the threads of the male and female screw members 95, 96 are always in close contact with each other so that frictional force is generated. Therefore, in a case where a vibratory load is input to the female screw member 96 from the rear wheel W, or where a large load is input to the female screw member 96 from the rear wheel W, it is possible to prevent the male screw member 95 from rotating spontaneously and thus to prevent the toe angle of the rear wheel W from changing unexpectedly. Thus, control accuracy of the toe angle is improved. As a result, there is no need to apply a current to the motor 36 for the purpose of restraining an unintentional rotation of the male screw member 95, reducing power consumption of the motor 36.

A stroke sensor 102 is provided in the second housing 32. When controlling a telescopic movement of the toe control actuator 14, the stroke sensor 102 detects an axial position of the output rod 33 and feeds back the detected axial position to a control unit. The stroke sensor 102 includes a detectable portion 104 fixed to the outer peripheral surface of the output rod 33 with a bolt 103, and a sensor main body 106 accommodating a detecting portion 105 which detects a position of the detectable portion 104. The detectable portion 104 may be a permanent magnet, and the detecting portion 105 may be a coil which magnetically detects the position of the detectable portion 104. The second housing 32 includes an opening portion 32b which provides a clearance having a certain length in the axial direction. The opening portion 32b allows the output rod 33 and the detectable portion 104 to move without interfering with the second housing 32.

A ring-shaped stopper 107 is provided on the outer peripheral surface of the output rod 33. When the output rod 33 is moved in a protruding direction, the stopper 107 eventually hits a contact surface 93b of the end member 93, whereby the output rod 33 reaches its outermost position. Thus, even when the motor 36 rotates out of control due to some kind of failure, the stopper 107 reliably prevents the output rod 33 from slipping out of the second housing 32. Because the stopper 107 is disposed within a dead space between the first and second slide bearings 91, 92, a space can be saved. The end member 93, on which the second slide bearing 92 is provided, can be separated from the second housing 32. Therefore, the output rod 33 equipped with the stopper 107 can be attached to and detached from the second housing 32 without interfering with the second slide bearing 92.

A boot 108 is provided in order to prevent water and dust from entering a gap between the second housing 32 and output rod 33. The boot 108 has one end portion fitted in a circumferential stepped portion 32c of the second housing 32 and the other end portion fitted in a circumferential groove 33a of the output rod 33. The respective end portions of the boot 108 are then fixed by associated bands 109, 110. A flange 93a of the end member 93 forms a circumferential groove together with the circumferential stepped portion 32c of the second housing 32. Thus, the end portion of the boot 108 fixed by the band 109 can be prevented from slipping off. Because the flange 93a of the end member 93 is utilized to prevent the boot 108 from slipping off, it is not necessary to form a circumferential groove on the second housing 32. Compared with a process of forming a circumferential groove on the second housing 32, a process of forming the circumferential stepped portion 32c is easier. Further, because the circumferential stepped portion 32c requires only one shoulder portion while a circumferential groove requires two shoulder portions, a dimension of the second housing 32 in the axial direction can be reduced by an amount equivalent to a width of one of the two shoulder portions.

When the output rod 33 telescopically moves, inner pressure the first and second housings 31, 32 changes, and this might obstruct a smooth actuation of the toe control actuator 14. Thus, a hole 33b is formed through the output rod 33 so as to communicate an internal space of the hollow output rod 33 and an internal space of the boot 108. This hole 33b allows the boot 108 to absorb the change of the above-mentioned inner pressure by deforming, thereby enabling the smooth actuation of the toe control actuator 14.

Figure 8:
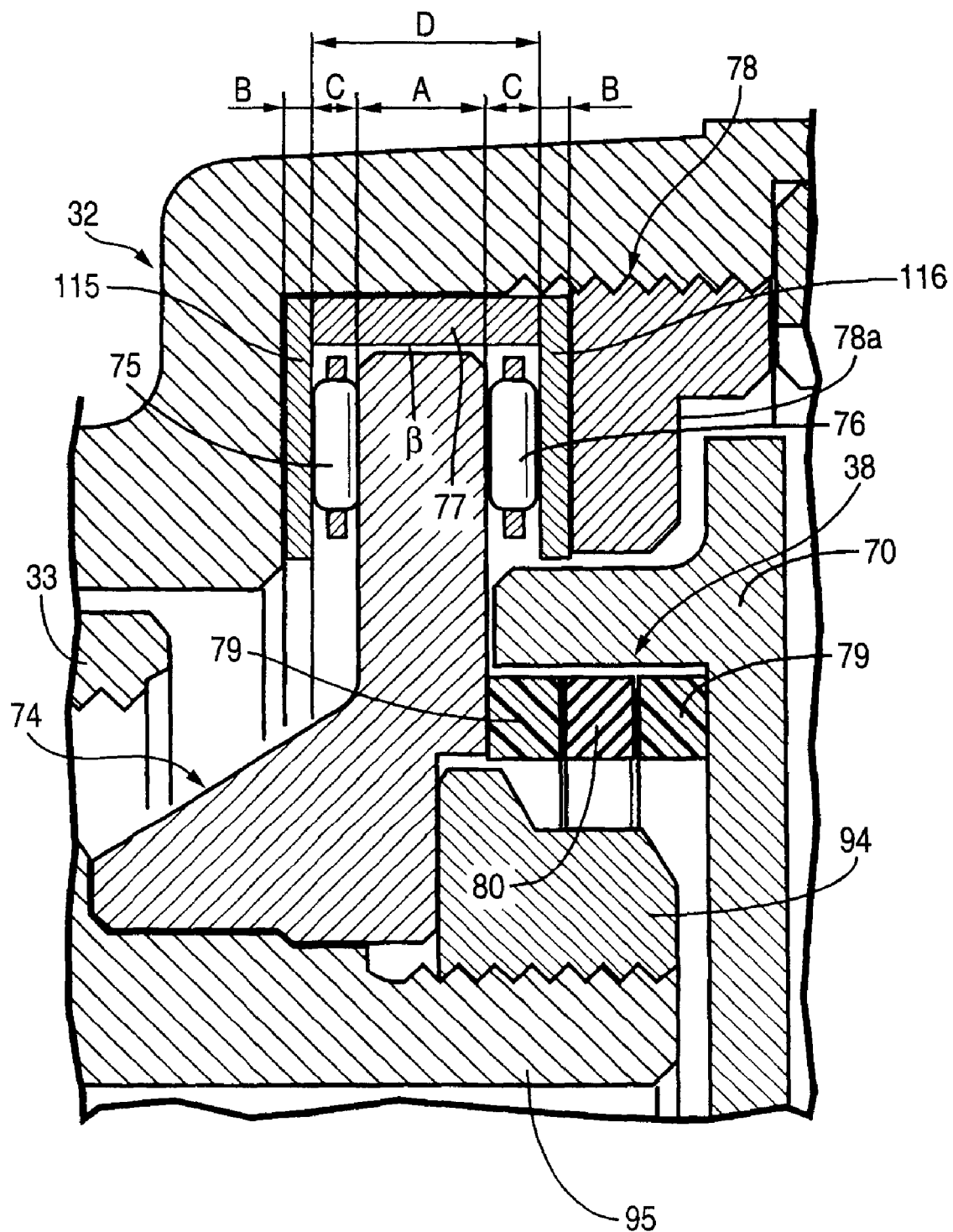
FIG. 8 is an enlarged view of the portion 8 shown in FIG. 4.

As described above, the pair of thrust bearings 75, 76 holds the respective side surfaces of the input flange 74 therebetween and supports the thrust load. Further, as shown in FIG. 8, a slight clearance β is provided between the outer peripheral surface of the input flange 74 and an inner peripheral surface of the spacer collar 77 so as to allow the input flange 74 to move in the radial direction. Thus, the male screw member 95 coupled to the input flange 4 is floatingly supported such that the male screw member 95 is relatively movable in the radial direction with respect to the female screw member 96. Therefore, a radial load is prevented from being excessively applied to respective engaging portions of the male screw member 95 and the female screw member 96, thereby enabling a smooth actuation of the feed screw mechanism 39.

Both the second housing 32 and the spacer collar 77, which is fixed to the second housing 32 by the lock nut 78, may be made of same material, e.g., aluminum material. In such a case, a fastening axial force of the lock nut 78 can be prevented from varying due to thermal expansion caused by temperature change, thereby enabling a stable support of the input flange 74 with the thrust bearings 75, 76.

Mutually opposing inner surfaces of the pair of thrust bearings 75, 76 directly contact the respective side surfaces of the input flange 74, whereas outer surfaces of the pair of thrust bearings 75, 76 contact the inner surface of the second housing 32 and an inner surface of the lock nut 78 respectively through a pair of washers 115, 116. An outer peripheral portion of the washer 115 is held between the second housing 32 and spacer collar 77, whereas an outer peripheral portion of the other washer 116 is held between the lock nut 78 and spacer collar 77. According to this structure, play of the thrust bearings 75, 76 in the axial direction can be reduced. Also, the number of parts required in the structure as well as a dimension in the axial direction can be reduced. Reasons therefore will be given below with reference to a configuration shown in FIG. 9.

Figure 9:
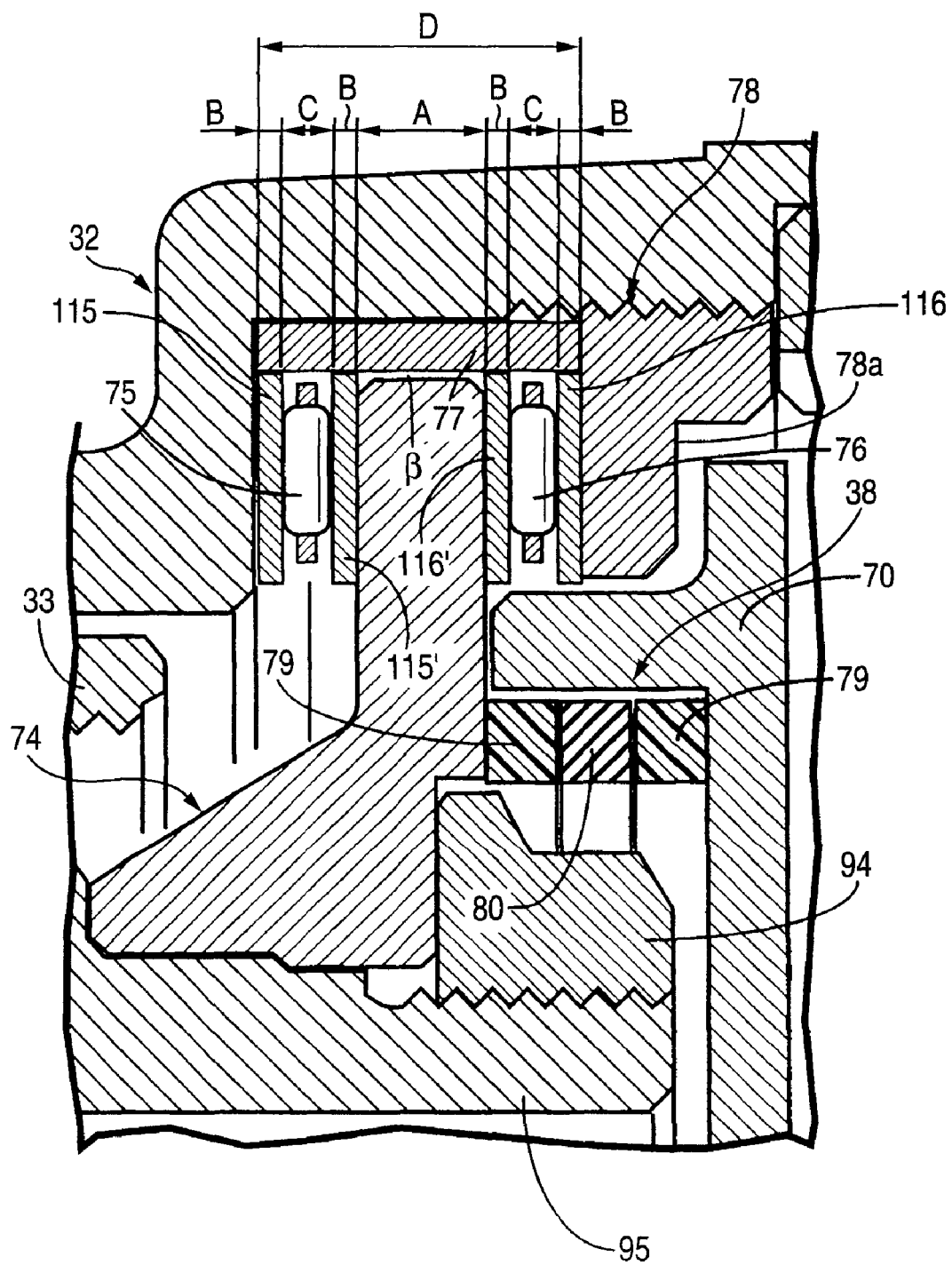
FIG. 9 is a view corresponding to FIG. 8 but illustrating a configuration of a related art

In the configuration shown in FIG. 9, the thrust bearing 75 contacts the washer 115 on a side of the second housing 32 and also contacts another washer 115' on a side of the input flange 74, whereas the other thrust bearing 76 contacts the washer 116 on a side of the lock nut 78 and also contacts another washer 116' on a side of the input flange 74. Respective ends of the spacer collar 77 directly contact the second housing 32 and the lock nut 78 respectively, whereby the spacer collar 77 is held therebetween. Accordingly, outer peripheral portions of the respective washers 115, 115', 116, 116' face the inner peripheral portion of the spacer collar 77.

Therefore, where a thickness of the input flange 74 is expressed as A, a thickness of each of the four washers 115, 115', 116, 116' is expressed as B, a thickness of each of the thrust bearings 75, 76 is expressed as C, and their tolerances are respectively expressed as $\Delta A$, $\Delta B$, $\Delta C$, a maximum value of the play to be generated in relation to the thrust bearings 75, 76 becomes $\Delta A + 4 \times \Delta B + 2 \times \Delta C$ under the condition that a thickness D of the spacer collar 77 is accurate (its tolerance $\Delta D = 0$). When the tolerance $\Delta D$ exists in the thickness D of the spacer collar 77, the maximum value of the play reaches $\Delta A + 4 \times \Delta B + 2 \times \Delta C + \Delta D$.

On the other hand, in the embodiment shown in FIG. 8, the maximum value of the play to be generated in relation to the thrust bearings 75, 76 can be reduced down to $\Delta A + 2 \times \Delta C$ under the condition that the thickness D of the spacer collar 77 is accurate (its tolerance $\Delta D = 0$). Even when the tolerance $\Delta D$ exists in the thickness D of the spacer collar 77, the maximum value of the play can be controlled down to $\Delta A + 2 \times \Delta C + \Delta D$, whereby the maximum value of the play to be generated in relation to the thrust bearings 75, 76 can be reduced by an amount equivalent to $4 \times \Delta B$, i.e. a total tolerance of the four washers 115, 115', 116, 116'.

Namely, according to the configuration of the embodiment shown in FIG. 8, when compared with the configuration shown in FIG. 9, the play to be generated in relation to the thrust bearings 75, 76 can be reduced. Also, the number of the washers 115, 116 required in the embodiment shown in FIG. 8 is two, which is less by two than the configuration shown in FIG. 9 in which the number of the washers 115, 115', 116, 116 is four. Thus, the number of parts required in the structure can be reduced while also reducing the axial dimension of the structure.

Further, the lock nut 78, which is used to fix the two washers 115, 116 and the spacer collar 77 to the second housing 32, is formed to have an L-shaped section, thereby providing a recessed portion 78a on a rear surface thereof. According to this structure, the outer peripheral portion of the second carrier 70 can be disposed inside the recessed portion 78a so that the second planetary gear mechanism 62 is disposed closer to the coupling 38, thereby reducing the axial dimension of the structure.

Although a telescopic actuator according to the present invention is used as the toe control actuator 14 in the above-described embodiment, it may be used for other various purposes. When a telescopic actuator according to the present invention is used as the toe control actuator 14, a load to be downwardly applied to the spring of the suspension S can be reduced due to its small size and light weight.

While description has been made in connection with embodiments of the present invention, those skilled in the art will understand that various changes and modification may be made therein without departing from the present invention. It is aimed, therefore, to cover in the appended claims all such changes and modifications falling within the true spirit and scope of the present invention.

What is claimed is:

1. A telescopic actuator comprising:
   a motor;
   an input flange rotated by the motor;
   a male screw member coupled to the input flange;
   a female screw member threadedly engaged with the male screw member;
   an output rod coupled to the female screw member, being moved in an axial direction thereof to output a thrust force when the input flange is rotated; and
   a housing inside which the male screw member and the female screw member are accommodated,
   wherein the input flange is held between a pair of thrust bearings to restrict the movement of the input member with respect to the housing in an axial direction,
   wherein a clearance is provided between the input flange and the housing to allow movement in the radial direction.

2. The telescopic actuator according to claim 1, wherein at least two portions of the output rod along the axial direction thereof are supported by the housing.

3. The telescopic actuator according to claim 2, further comprising a pair of slide bearings each disposed on the respective two portions of the output rod, wherein the output rod is supported by the housing via the pair of slide bearings.

4. The telescopic actuator according to claim 1, further comprising an elastic bush portion coupled to the input flange, wherein a rotation of the motor is transmitted to the input flange through the elastic bush portion.

5. The telescopic actuator according to claim 1, wherein the male screw member is formed with a hole penetrating therethrough in the axial direction.

6. The telescopic actuator according to claim 1, wherein the thrust bearings are located axially on opposite sides of the input flange and abut sides surfaces of the input flange.

7. A telescopic actuator comprising:
a motor;
an input flange rotated by the motor;
a male screw member coupled to the input flange;
a female screw member threadedly engaged with the male screw member;
an output rod coupled to the female screw member, being moved in an axial direction thereof to output a thrust force when the input flange is rotated; and
a housing inside which the male screw member and the female screw member are accommodated,
a spacer collar;
a lock nut fastened to the housing interposing the spacer collar therebetween; and
a pair of thrust bearings interposing the input flange therebetween,
wherein the input flange is supported by the housing and between the housing and lock nut via the pair of thrust bearings such that a relative movement of the input flange with respect to the housing is allowed in a radial direction, but restricted in the axial direction, and the housing and the spacer collar are made of same material.

8. The telescopic actuator according to claim 7, wherein the lock nut has an L-shaped section to provide a ring-shaped recessed portion.

9. The telescopic actuator according to claim 7, further comprising a pair of washers interposing the pair of thrust bearings therebetween, wherein one of the washers contacts the housing and is held between the housing and the input flange, and the other of the washers contacts the lock nut and is held between the lock nut and the input flange.

10. The telescopic actuator according to claim 9, wherein the spacer collar is held between the pair of washers.

11. The telescopic actuator according to claim 7, wherein the pair of thrust bearings directly contacts the input flange.

* * * * *